United States Patent [19]

Ikegami

[11] 4,253,176

[45] Feb. 24, 1981

[54] GEAR TRAIN MECHANISM OF A WATCH

[75] Inventor: Toshimasa Ikegami, Suwa, Japan

[73] Assignee: Kabushiki Kaisha Suwa Seikosha, Tokyo, Japan

[21] Appl. No.: 973,763

[22] Filed: Dec. 27, 1978

[30] Foreign Application Priority Data

Dec. 27, 1977 [JP] Japan ................................ 52-160845

[51] Int. Cl.[3] ......................... G04C 15/00; G06F 1/04; G04F 5/00; G04B 1/00

[52] U.S. Cl. .................................... 368/155; 368/139; 368/76

[58] Field of Search ................ 58/125 R, 23 D, 7, 57, 58/59; 368/76, 139, 155

[56] References Cited

U.S. PATENT DOCUMENTS

| | | | |
|---|---|---|---|
| 2,781,630 | 2/1957 | Bamat | 58/125 R |
| 3,381,468 | 5/1968 | Jeanmonod et al. | 58/57 |
| 4,074,517 | 2/1978 | Tatsumi et al. | 58/140 R |
| 4,077,199 | 3/1978 | Sakuma et al. | 58/23 BA |
| 4,079,582 | 3/1978 | Tamaru et al. | 58/23 D |
| 4,087,957 | 5/1978 | Miyasaka et al. | 58/23 R |
| 4,123,895 | 11/1978 | Miyazaki | 58/23 BA |

*Primary Examiner*—Gene Z. Rubinson
*Assistant Examiner*—John B. Conklin
*Attorney, Agent, or Firm*—Blum, Kaplan, Friedman, Silberman & Beran

[57] ABSTRACT

A gear train mechanism for a wristwatch provides a thinner watch, the gear train comprising a frame plate, a dial, a plate interposed between the dial and the frame plate, and a shaft rotatably supporting a center wheel and pinion. The shaft is attached to the frame plate. Rubbing and misalignment of the hands is prevented by aligning their rotating support members for an extended longitudinal distance on the shaft. This is accomplished by the gear train of this invention despite a reduction in the thickness of the watch. Hour and minute hands or hour, minute, and second hands are provided in alternative embodiments.

17 Claims, 2 Drawing Figures

GEAR TRAIN MECHANISM OF A WATCH

BACKGROUND OF THE INVENTION

This invention relates generally to a wristwatch of the electronic type and more particularly to a wristwatch where the gear train allows for a thinner overall construction. This is accomplished without shaking or rubbing of the hands. In the prior art there has been a conflict between the thickness of the overall watch and the operating condition of the hands. Generally, the thinner that the watch is made, the more likely it is that the hands will shake or rub together. As a result, thinner gear trains have usually resulted in more space being required between the hands and between the dial and glass in order to prevent rubbing. Accordingly, the overall effect is that the watch is not reduced in thickness. A watch hand will tend to shake if the rotating support member to which it is attached is not aligned and supported along a substantial length. The very small size of these individual components makes it extremely difficult to produce a hand which will not shake when the support member for that hand is short.

In one conventional method for rotatably supporting the center wheel and pinion, the upper tenon is rotatably supported by the train wheel bridge and the lower tenon is rotatably supported by the plate. For purposes of this application, a tenon is a projecting member of a component, this projecting member being inserted for support in another element, generally a plate. The tenon may be a rotating connection between the elements or a fixed connection between the elements, as stated in the following description. In another conventional method, the center wheel and pinion is provided on the backside of the plate and is supported by the support shaft of the center wheel and pinion which is positioned on the plate. In the former method, the thinner the watch becomes, the shorter is the distance between the place where the upper tenon is supported and the place where the lower tenon is supported. As a result shaking of the hands becomes greater. Consequently, it is necessary to provide a wide space between the upper surface of the dial and the lower surface of the glass enclosure, usually known as the crystal, wherein the hands are mounted. Thereby, the watch becomes thicker in spite of the fact that the gear train itself may be thinner.

On the other hand, if the space available for mounting the hands is of conventional height, it is difficult to mount the hands and a problem, namely, a rubbing of the hands one against the other, is likely to occur. In the latter method described above, the center wheel and pinion are arranged on the dial side, or front side, of the plate, then a third wheel pinion is necessary on the front side of the plate. Accordingly, the lower tenon of the third wheel and pinion should be rotatably supported by another member and the plate. Therefore, the range of variation of the central distance from the center wheel to the third wheel pinion becomes larger. The engagement of the wheels is unsettled and the thickness of the watch is not less than the additive thickness of the members. When the lower tenon of the third wheel and pinion is supported by the plate, as is well known in the art, the weight of the hour wheel directly falls on the center wheel and pinion. Thus this gear train design cannot be applied, especially to a gear train for a watch wherein the driving torque is small, for example, an analog quartz crystal watch.

What is needed is a gear train mechanism for a wristwatch which allows for a thin watch and does not cause problems or rubbing or shaking of the hands.

SUMMARY OF THE INVENTION

Generally speaking, in accordance with the invention, a gear train mechanism especially suitable for a thin wristwatch is provided. The gear train comprises a frame plate, a dial, a plate interposed between the dial and frame plate, and a shaft rotatably supporting a center wheel and pinion. The shaft is attached to the frame plate. Rubbing and misalignment of the hands of the wristwatch are prevented by aligning their concentric rotating support members over an extended longitudinal distance on the shaft. This objective is accomplished by the gear train of this invention despite a reduction in the thickness of the watch. The support shaft provides a center of rotation for all of the hands and their support members. In some embodiments of this invention the shaft supports the hands at a position beyond the surface of the plate which faces the dial, and in other embodiments of this invention the shaft supports the hands at a position beyond the dial in the space between the dial and glass.

Accordingly, it is an object of this invention to provide a gear train mechanism which allows for a thinner wristwatch.

Another object of this invention is to provide a gear train mechanism for a wristwatch which allows the hands to rotate without shaking or rubbing.

Still another object of this invention is to provide a gear train mechanism which supports the hands at a location close to the glass.

Yet another object of this invention is to provide a gear train mechanism wherein the weight of the hour wheel does not fall upon the center wheel and pinion.

Another object of this invention is to provide a gear train mechanism which is easy to assemble in production.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
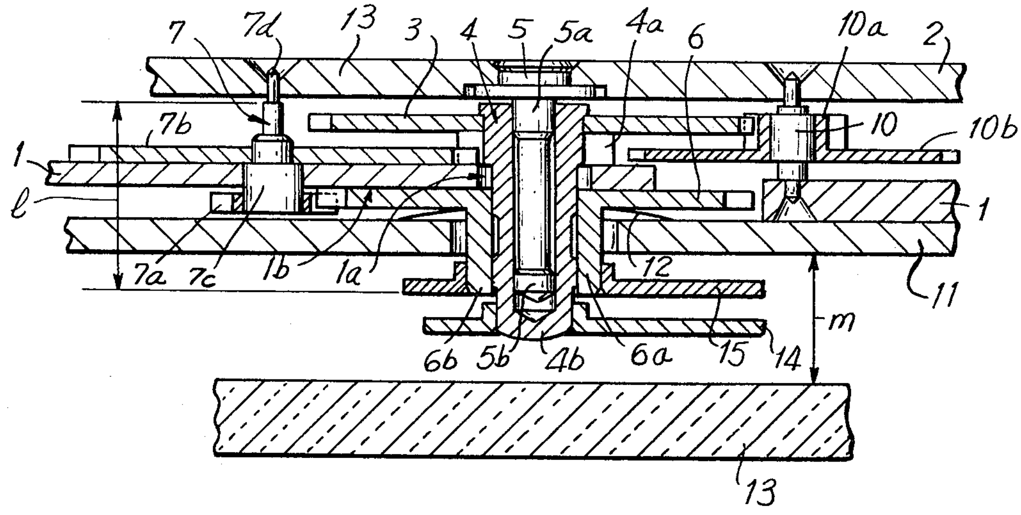
FIG. 1 is a cross-sectional elevational view showing the gear train mechanism for a two-hand watch in accordance with this invention.

FIG. 1 is an elevational cross-sectional view of a gear train mechanism of a watch having two hands. The gear train mechanism of this invention comprises a plate 1, and a train wheel bridge 2 on which is positioned the support shaft 5. The center wheel pinion assembly 4 includes the pinion **4*a* and the extended hollow hub 4*b*. The extended hollow hub 4*b* fits rotatably over the shaft 5. The center wheel 3**, is concentrically connected to the hub 4*b* and is adjacent the pinion 4*a*. The center wheel 3 is attached frictionally to the center wheel pinion assembly 4 in such a way that both parts usually rotate as a single body, however, during the time for setting of the hands, there is a slipping rotation between the center wheel 3 and the pinion 4*a*. The center wheel 3 and pinion 4*a* provided on the backside 16 of the plate 1, and the minute hand 14 is fixedly attached to the end of the extended hollow hub 4*b*.

The hour wheel 6 is located on the front side 18 of the plate 1 and is rotatably supported on the external surfaces of the extended hollow hub 4*b* associated with the minute hand 14. The hub 6*a* of the hour wheel 6 extends along the center wheel hub 4*b* forward in the direction of the glass 13 and beyond the dial 11. The hour hand 15 which is positioned between the dial 11 and the minute hand 14 is fixed proximate the end 6*b* of the hub 6*a*. The weight of the hour wheel 6 does not fall on the center wheel 3 and pinion 4*a* because the plate 1 lies between the hour wheel 6 and the center wheel 3 and pinion 4*a*. It should be noted that the hour wheel 6 is positioned adjacent the recessed surface 1*b* in the plate 1, permitting the production of a thinner watch.

The minute wheel element 7 comprises the minute wheel 7*b* having teeth in engagement with the center wheel pinion 4*a*. Also, a minute wheel pinion 7*a* engages with the hour wheel 6. The minute wheel element 7 is rotatably journaled in the plate 1 by means of the lower tenon or bearing 7*c*. The lower tenon 7*c* is constrained between the minute wheel pinion 7*a* and the minute wheel gear 7*b* which are held to the minute wheel element 7 by an interference fit. The minute wheel element 7 is constrained at its upper end by the upper tenon or pivot pin 7*d* which is recessed into the train wheel bridge 2 and allows for free rotation of the minute wheel element 7. A third wheel and pinion element 10 comprises third wheel pinion 10*a* and a third wheel 10*b*. The pinion 10*a* engages the teeth of the center wheel gear 3. The third wheel and pinion element 10 is rotatably supported at the lower end by a pivot recessed into the plate 1 and at the upper end by a pivot recessed into the train wheel bridge 2. As stated above, the dial 11 is interposed between the hour wheel 6 and the glass 13. The spring washer 12 fits concentrically around the hub 6*a* and is located between the dial 11 and the hour wheel 6. The spring washer 12 pushes the hour wheel 6 toward the plate 1 and separates it from the dial 11.

The support shaft 5 for the toothed pinion 4*a* and center wheel gear 3, aligns the hollow hub 4*b* by means of a guiding bearing or upper tenon 5*a* adjacent to the train wheel bridge 2. The hub 4*b* is also supported on the shaft 5 by means of the lower guide bearing or lower tenon 5*b* nearer to the glass 13. The distance l between the upper tenon 5*a* and the lower tenon 5*b* is a major factor in the accuracy of rotation of the minute hand 14 and hour hand 15, which rotate concentrically about the shaft 5 as seen in FIG. 1. The greater is the length l, the easier it is to make accurately operating hands for the wristwatch. In the embodiment of this invention shown in FIG. 1, the distance l is made much greater than that obtained by the conventional supporting method used in the prior art, because the lower tenon or bearing 5*b* is extended to a position beyond the front side 18 of the recess 1*b* in the plate 1 in which the hour wheel gear 6 is seated. Also, the upper end of the shaft 5 is seated in the train wheel bridge 2 and the support and aligning bearing 5*a* is located adjacent the train wheel bridge 2, thereby this bearing 5*a* is at a point farthest from the dial 11 and glass 13, thereby providing an increased distance l between the bearings 5*a* and 5*b*.

Therefore, even though the gear train assembly, is toto, is made to be very thin, the shaking of the minute hand 14 becomes extremely small and as a consequence, it is possible to make the space between the minute hand 14 and the glass 13 very small also. And the space between the minute hand 14 and the hour hand 15 may also be made small when the hands turn truly about a fixed axis. Thus the gear train is thin and the space m required for mounting the hands between the dial 11 and the glass 13 also becomes small, providing an overall net effect of a very thin watch.

Notice that there is no precision fit between the center wheel hollow hub 4*b* and the plate 1. In assembly the center wheel and pinion hub 4*b* is simply guided through the opening 1*a* provided in the plate 1. The hub 6*a* of the hour wheel 6 rides on the outer periphery of the hollow hub 4*b* and is concentric therewith. The radial play between the portion of the hollow hub 4*b* supporting the hour wheel 6 and the opening 1*a* in plate 1 is limited to the extent that these parts do not touch due to tolerances and variations in the size of parts. In assembling the gear train, after the hub 4*b* has been passed through the opening 1*a* in the plate 1, the lower end 5*b* of the center support shaft 5 is inserted into the hub 4*b*. Then it is relatively simple to find the receptacles in the train wheel bridge 2 and seat the minute wheel element 7, the third wheel, pinion element 10 and the bridge feet in their respective receptacles, by rotating the train wheel bridge 2 about the shaft 5. Therefore, it is much easier to find the mating position between each of the upper tenons of the gear train and the receptacles located in the train wheel bridge 2 in this invention than in the gear trains of the prior art.

Figure 2:
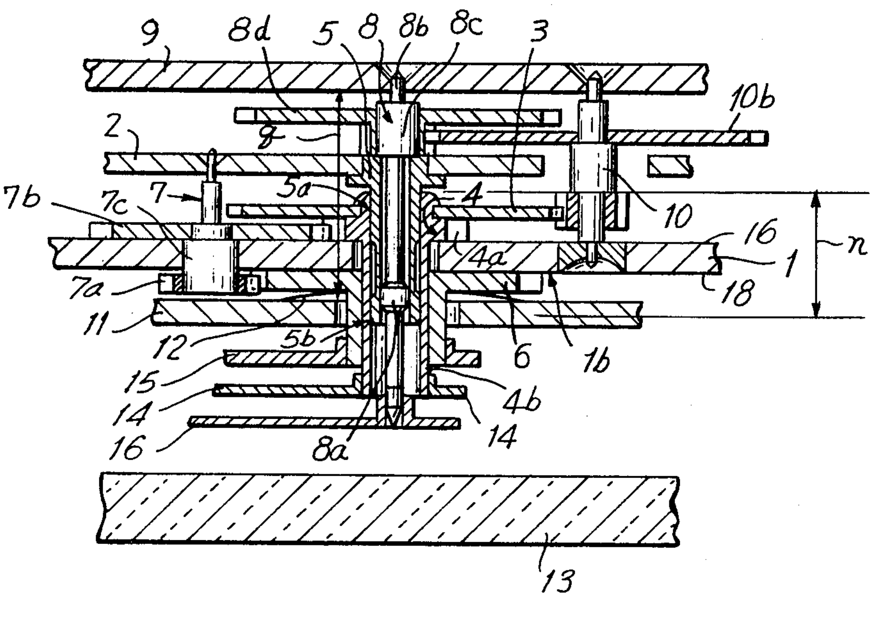
FIG. 2 is a view similar to FIG. 1 for a three-hand watch.

An alternative embodiment of this invention, that is, a gear train for a watch having three hands, is shown in FIG. 2. Corresponding parts in both embodiments (FIGS. 1, 2) are indicated in the drawings with the same reference numbers. As in the embodiment of FIG. 1, the support shaft 5 for the center wheel 3 is positioned on the train wheel bridge 2. The center wheel 3 and the center wheel pinion 4*a* are positioned on the backside 16 of the plate 1. This is similar to FIG. 1. The center wheel pinion assembly 4, comprising the toothed pinion 4*a* and the extended hollow hub 4*b*, are rotatably supported on the outer circumference of the support shaft 5. The lower bearing surface or tenon 5*b* is positioned closer to the dial 11 than is the recessed surface 1*b* on the plate 1. The minute hand 14 is fixed to the end of the hollow hub 4*b* of the center wheel pinion assembly 4 and rotates therewith. The sweep second wheel and pinion assembly 8 comprises a lower bearing or tenon 8*a*, an upper pivot pin or tenon 8*b*, a fourth wheel pinion 8*c* in engagement with the teeth of a third wheel 10*b*, and a fourth wheel 8*d*. It is a generally conventional sweep second wheel and pinion arrangement. The lower tenon 8*a* is aligned and rotatably supported by the inner circumference of the support shaft 5, and the upper tenon 8*b* is aligned and supported by the third wheel bridge 9. Therefore the distance q between the supporting and aligning points 8*a* and 8*b*, for the sweep second wheel and pinion assembly 8 is longer and more satisfactory than that attained in the conventional prior art techniques for supporting the center wheel and pinion assembly 4 and the sweep second wheel and pinion assembly 8. The distance n, corresponding to the distance l of FIG. 1, is also of greater length than in the conventional designs, as discussed above. Consequently, shaking of the minute hand 14 and the second hand 16 becomes very small and it is possible to make a thin watch without interference between the hands. With regard to the hour wheel gear 6, the hour hand 15, the third wheel and pinion element 10, the dial 11, the dial washer 12, and the minute wheel element 7, these elements and components are the same as in the embodiment of FIG. 1 and perform the same functions in the same manner. Therefore, further explanation is omitted here.

As stated above, in accordance with this invention, the distance between bearings required for the alignment of the center wheel and pinion is obtained satisfactorily even in an extremely thin gear train mechanism. The space needed for positioning the hands can be made small by firmly positioning the support shaft on the train wheel bridge and rotatably supporting thereon the center wheel and pinion assemblies and the sweep second wheel and pinion assembly. As a result, it is possible to produce a thin watch and further to facilitate assembly of the watch. In the embodiments according to this invention, the support shaft 5 is positioned on the frame plate, i.e., the train wheel bridge 2 which is located at the backside of the plate 1. The fixed shaft 5 supports the center wheel and pinion assembly 4 and the sweep second wheel and pinion assembly 8. But in alternative embodiments of this invention, it is possible that the support shaft 5 may be supported not only on the frame plate defined by the train wheel bridge but also on the frame plate of a circuit block, a balance cock, a palatecock, a rotor stator, a locking wheel bridge, or any supporting member used to retain the gear train in position which is located on the backside of the plate 1. The plate in the embodiments according to this invention, means the frame plate which holds in place most of the members of the watch.

Thus it is seen that the gear train of this invention eliminates the deficiencies encountered in the prior art as described above. The watch is made thinner and assembly is facilitated by positioning the support shaft 5 on a plate member which is located on the backside of the plate 1 and by supporting at least one tenon of the center wheel and pinion assembly 4 and at least one tenon of the sweep second wheel and pinion assembly 8 in rotating relationship to the shaft 5.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

What is claimed is:

1. A gear train mechanism for a wristwatch comprising:

a plate;

a dial located on one side of said plate;

a frame plate located on the other side of said first plate;

a shaft, the base of said shaft being supported on said frame plate, an end portion of said shaft protruding out of a recess in said plate toward the dial; and a center wheel and pinion assembly, said center wheel and pinion assembly being rotatably supported on said shaft, at least said protruding end portion supporting said center wheel and pinion assembly, said center wheel and pinion assembly being positioned between said plate and said frame plate, and an hour wheel gear arranged concentrically with said center wheel and pinion assembly, said hour wheel gear being positioned on a surface of said plate between said plate and said dial and isolated from transmitting forces to said center wheel.

2. The gear train mechanism of claim 1, wherein said shaft is hollow and the outer circumference of said shaft rotatably supports said center wheel and pinion assembly, and further comprising a sweep second wheel and pinion assembly, the inner circumference of said shaft supporting said sweep second wheel and pinion assembly.

3. The gear train mechanism of claim 1 including at least two frame plates, the frame plate supporting said shaft being the farthest of said at least two frame plates away from said dial.

4. The gear train mechanism of claim 1, and further including a recess in said plate, said hour wheel being positioned in said recess.

5. The gear train mechanism of claim 4, and further including a sweep second wheel and pinion assembly, and wherein said center wheel and pinion assembly and said sweep second wheel and pinion assembly are rotatably supported at at least one position nearer said dial than said recess for said hour wheel.

6. The gear train mechanism of claim 5 wherein another position of rotatable support is proximate said base of said shaft.

7. A gear train mechanism for a wristwatch as claimed in claim 1 and further comprising:

a train wheel bridge;

and wherein said shaft does not rotate in cooperation with any element in said gear train.

8. The gear train mechanism of claim 7, wherein said hour wheel is supported on the hub of said center wheel pinion assembly.

9. The gear train mechanism of claim 8, wherein a dial is positioned between said hour wheel and the covering glass of said wristwatch and an hour hand is attached to said hour wheel, and a minute hand is attached to said center wheel pinion.

10. The gear train mechanism of claim 9, wherein said center wheel and pinion assembly is rotatably supported on the outside circumference of said shaft, at least one point of said rotatable support being located between said dial and said glass.

11. The gear train mechanism of claim 10, and further comprising a sweep second wheel and pinion assembly, said sweep second wheel and pinion assembly rotating concentrically with said shaft.

12. The gear train mechanism of claim 11, wherein said shaft is hollow and said sweep second wheel and pinion assembly is mounted for said concentric rotation on the inside surface of said hollow shaft.

13. The gear train mechanism of claim 12, wherein said plate has a recess therein for said hour wheel and said center wheel and pinion assembly and said sweep second wheel and pinion assembly are supported at positions closer to said dial than said recess in said plate.

14. The gear train mechanism of claim 13, and further comprising a third wheel bridge, said third wheel bridge being farther from said dial than said train wheel bridge, said sweep second wheel and pinion assembly being rotatably supported in said third wheel bridge.

15. The gear train mechanism of claim 1, wherein said shaft is fixed against rotation relative to said frame plate.

16. The gear train mechanism of claim 7, wherein said shaft is fixed against rotation relative to said train wheel bridge.

17. The gear train mechanism of claim 1 wherein said center wheel and pinion assembly includes an extended hollow hub and a pinion, said hollow hub and pinion being integral, and a center wheel, said center wheel being frictionally engaged with said extended hollow hub.

* * * * *